(12) United States Patent
Kim

(10) Patent No.: US 7,367,357 B2
(45) Date of Patent: May 6, 2008

(54) SOLENOID BALL VALVE WITH BYPASS ORIFICE

(75) Inventor: Tae-Kyung Kim, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 352 days.

(21) Appl. No.: 11/071,703

(22) Filed: Mar. 2, 2005

(65) Prior Publication Data

US 2006/0196566 A1 Sep. 7, 2006

(51) Int. Cl.
*F15B 13/044* (2006.01)
(52) U.S. Cl. .................... 137/625.65; 137/596.17; 137/569.2
(58) Field of Classification Search ........... 137/596.17, 137/596.2, 625.65; 123/90.12, 90.1
See application file for complete search history.

(56) References Cited

U.S. PATENT DOCUMENTS

| 5,127,435 | A | * | 7/1992 | Takata et al. | ........... 137/596.17 |
| 5,299,600 | A | * | 4/1994 | Aronovich | ............. 137/625.65 |
| 5,333,945 | A | * | 8/1994 | Volz et al. | ............. 137/596.17 |
| 6,209,563 | B1 | | 4/2001 | Seid et al. | |
| 6,494,191 | B2 | * | 12/2002 | Bingham et al. | ...... 137/625.65 |
| 6,668,801 | B2 | | 12/2003 | Smith et al. | |
| 6,701,877 | B1 | | 3/2004 | Ottersbach et al. | |

* cited by examiner

*Primary Examiner*—John Rivell
(74) *Attorney, Agent, or Firm*—Anna M. Shih

(57) ABSTRACT

On/off solenoid ball valves of the invention comprise at least one inlet port; at least one pressure control outlet port; at least one exhaust port; at least one check valve positioned between the pressure control outlet port and the exhaust port; and at least one bypass orifice positioned to allow inlet fluid flow to the pressure control outlet port irrespective of whether the valve is in the "on" or "off" position. Because of their ability to provide unique and controlled flows, valves of the invention are able to be used in applications previously off limits to on/off solenoid ball valves.

10 Claims, 6 Drawing Sheets

SOLENOID BALL VALVE WITH BYPASS ORIFICE

BACKGROUND

The present disclosure relates to solenoid ball valves and bypass orifices thereof Many different types of valves are used to control a variety of fluids and in a variety of ways. Depending on the application, fluid flow is controlled in one or more manners. Pulse-width-modulated, on/off, and variable pressure are a few coined manners of controlling fluid flow known to those of skill in the art. To assist in control of fluid flow, solenoid (i.e., electrically actuated) valves that include electrical systems are often used due to their ability to efficiently and effectively control fluid flow in a variety of ways.

Specifically, on/off solenoid valves are used in many applications. For example, solenoid valves are useful in controlling the flow of hydraulic fluid in, for example, drive train systems of motor vehicles. A drive train system is that which transfers power from the engine to the wheels. It includes the clutch or torque converter, the transmission, differential, ring and pinion gears, axles, and where applicable drive shaft(s) and transfer case, universal and/or CV-joints. Within the drive train system, individual components can operate using a solenoid valve. During operation, an electronic controller provides an electrical signal to the solenoid valve, which then provides a corresponding pressure signal to a pressure actuator for effecting a desired movement of an associated component.

Generally, solenoid valves typically include at least a supply port (also referred to as an "inlet port") and a pressure control output port, which provide respective fluid flow to and from a valve's housing for operation of an external component in fluid communication therewith. The internal valve mechanics of solenoid valves vary widely within the valve housing.

One type of on/off solenoid valve comprises a ball valve having an inlet port, a pressure control outlet port, and an exhaust port through which fluid is discharged to a sump or is returned to rejoin the fluid supply. Such valves provide electrical control of a fluid pressure by controlling the flow of fluid from the inlet port to a valving chamber within the valve housing in an on/off manner. The valving chamber in these valves is in operable communication with the pressure control outlet port.

A desired pressure at the pressure control outlet port is generated by controlling the amount of fluid bleed to the exhaust port in relation to the fluid exiting the valving chamber via the pressure control outlet port. Conventionally, in ball valves of the on/off type, particularly those with controlled fluid flow between the pressure control outlet port and exhaust port (e.g., by placement of a flow control valve, such as a check valve, therebetween), pressure is generated at the pressure control outlet port only when the valve is in an "on" position. This occurs because the inlet port is only open for fluid flow to the valving chamber when in the "on" position.

Implicitly, ball valves include a ball disposed in the valving chamber, whereby the ball moves with respect to a valve seat that's adjacent to the inlet port. The ball moves via an operating rod mechanism disposed between the ball and a solenoid armature operating in response to an electric signal. In this arrangement, two electrical states are typically used—one for opening the valve, and one for closing the valve. Ball valves can provide many advantages over standard solenoid valves, some of which include, for example, higher permissible flow rates, lower resistance to flow resulting in a lower pressure drop across a valve, higher permissible pressure ratings, compatibility with a wide range of media, no minimum pressure requirements (differential pressure), and smoother operation (reducing water hammer). However, there is a continuing need for maximizing and improving the advantages offered by ball valves.

Although ball valves often provide smoother operation than other types of solenoid valves, there is a need to eliminate or, at a minimum, reduce turbulence within the valving chamber of such valves during operation. It is known that the presence of turbulence within solenoid valving chambers is a contributing factor in variable valve performance. As can be appreciated, reliable and predictable performance is highly desirable. Thus, on/off solenoid ball valves with improved reliability and performance are desired.

In addition, the ability to extend the applicable range of on/off solenoid ball valves is also desired. Conventional use of on/off solenoid ball valves is limited in certain applications. One such application is that requiring maintenance of a minimum pressure at the pressure control outlet port, irrespective of whether the valve is in the "on" or "off" position. Generally, those desiring this type of operation have been forced to utilize valves other than on/off solenoid ball valves for that purpose.

When using other types of valves, pressure may be generated at the pressure control outlet port during all positions of operation. For example, due to their design, spool valves inherently allow fluid leakage to the pressure control outlet port at all positions of operation. However, adequate control of this fluid leakage to obtain desired pressure levels at the pressure control outlet port has challenged those in the art. Therefore, alternative valves are desired. Due to the many benefits offered by solenoid ball valves, it would be highly desirable to utilize improved solenoid ball valves with enhanced applicability.

SUMMARY

According to the invention, enhanced on/off solenoid ball valves are provided. Solenoid ball valves of the invention are of the on/off type and include a check valve therein for controlling fluid flow between the valve's pressure control outlet port and exhaust port via a pathway comprising the valve's valving chamber. Previously unobtainable, solenoid ball valves of the invention are now capable of generating a pressure at the pressure control outlet port no matter what position the valve is in—"on" or "off."

During operation, pressure generated at the pressure control outlet port of a valve of the invention approximates the inlet port pressure when the valve is in the "on" position. When in the "off" position, pressure generated at the pressure control outlet port is generally less than that generated at the pressure control outlet port when the valve is in the "on" position. Because of their ability to provide unique and controlled flows (and associated pressures), valves of the invention are able to be used in applications previously off limits to on/off solenoid ball valves. Due to the valves' construction, the present invention also advantageously facilitates reduced or eliminated turbulence inside valving chambers within on/off solenoid ball valves by directing inlet fluid flow away from the valving chamber's ball in exemplary embodiments.

In an exemplary embodiment, an on/off solenoid ball valve of the invention comprises at least one inlet port; at least one pressure control outlet port; at least one exhaust port; at least one check valve positioned between the pressure control outlet port and the exhaust port; and at least one bypass orifice positioned to allow inlet fluid flow to the pressure control outlet port irrespective of whether the valve is in the "on" or "off" position. In a further embodiment, the valve comprises more than one inlet port. In yet a further embodiment, the valve comprises more than one pressure control outlet port. In still a further embodiment, the valve comprises more than one exhaust port. The valve can be a normally closed or normally open valve.

As noted, each valve of the invention comprises at least one check valve positioned between the pressure control outlet port and the exhaust port. In an exemplary embodiment, the check valve comprises a valve member located between a biasing member and a valve seat member. In a further embodiment, the check valve comprises a pressure-responsive compression spring.

As further noted, each valve of the invention comprises at least one bypass flow orifice positioned to allow inlet fluid flow to the pressure control outlet port irrespective of whether the valve is in the "on" or "off" position (i.e., irrespective of whether the ball valve member therein is seated against the valve housing adjacent the inlet port). According to one embodiment, valves of the invention comprise multiple bypass orifices arranged in a symmetrical manner with respect to the inlet port. In an exemplary embodiment, path of inlet fluid flow between the bypass orifice and the pressure control outlet port is essentially free of components that prevent continuous inlet fluid flow therethrough. Size and/or shape of the bypass flow orifice may be fixed or variable.

Valves of the invention are useful in many applications and are adapted thereto based on, for example, the types and pressures of fluids used in conjunction therewith. In an exemplary embodiment, the valve is useful in conjunction with an engine operating at a speed of about 500 rpm to about 9,000 rpm and fluid (i.e., oil) temperature of about −20° C. to about 140° C. In this embodiment, the valve is capable of generating and maintaining a fluid pressure of about 0.2 bar to about 1 bar at the pressure control outlet port during operation of the valve in the "off" state and a pressure of about 0.5 bar to about 10 bars at the pressure control outlet port during operation of the valve in the "on" state. The exhaust port may be maintained, for example, at approximately atmospheric pressure.

Exemplary applications of the valve include those associated with internal combustion engines. In one such embodiment, an internal combustion engine comprises at least one valve of the invention. Further exemplary applications of the valve include those associated with motorized vehicles. In one such embodiment, a drive train system for a motorized vehicle comprises at least one valve of the invention. According to another embodiment, a system for control of oil pressure for valve lifter activation/deactivation comprises at least one valve of the invention.

Methods of the invention include those associated with applications thereof. An exemplary method of the invention comprises generating a desired fluid pressure at a pressure control outlet port of an on/off solenoid ball valve. This exemplary method comprises providing an on/off solenoid ball valve of the invention; providing a source of inlet fluid flow; and operatively connecting the source of inlet fluid flow to the bypass orifice of the valve in order to provide continuous inlet fluid flow of the desired fluid pressure to the pressure control outlet port via the bypass orifice in both the "on" and "off" positions. In a further embodiment, the check valve operates such that the desired fluid pressure is not exceeded during operation of the valve in either the "on" or "off" position.

Another exemplary method of the invention comprises providing continuous inlet fluid flow to a pressure control outlet port of an on/off valve. This exemplary method comprises providing an on/off solenoid ball valve of the invention; providing a source of inlet fluid flow; and operatively connecting the source of inlet fluid flow to the bypass orifice of the valve in order to provide continuous inlet fluid flow to the pressure control outlet port via the bypass orifice in both the "on" and "off" positions.

DETAILED DESCRIPTION

Figure 1:
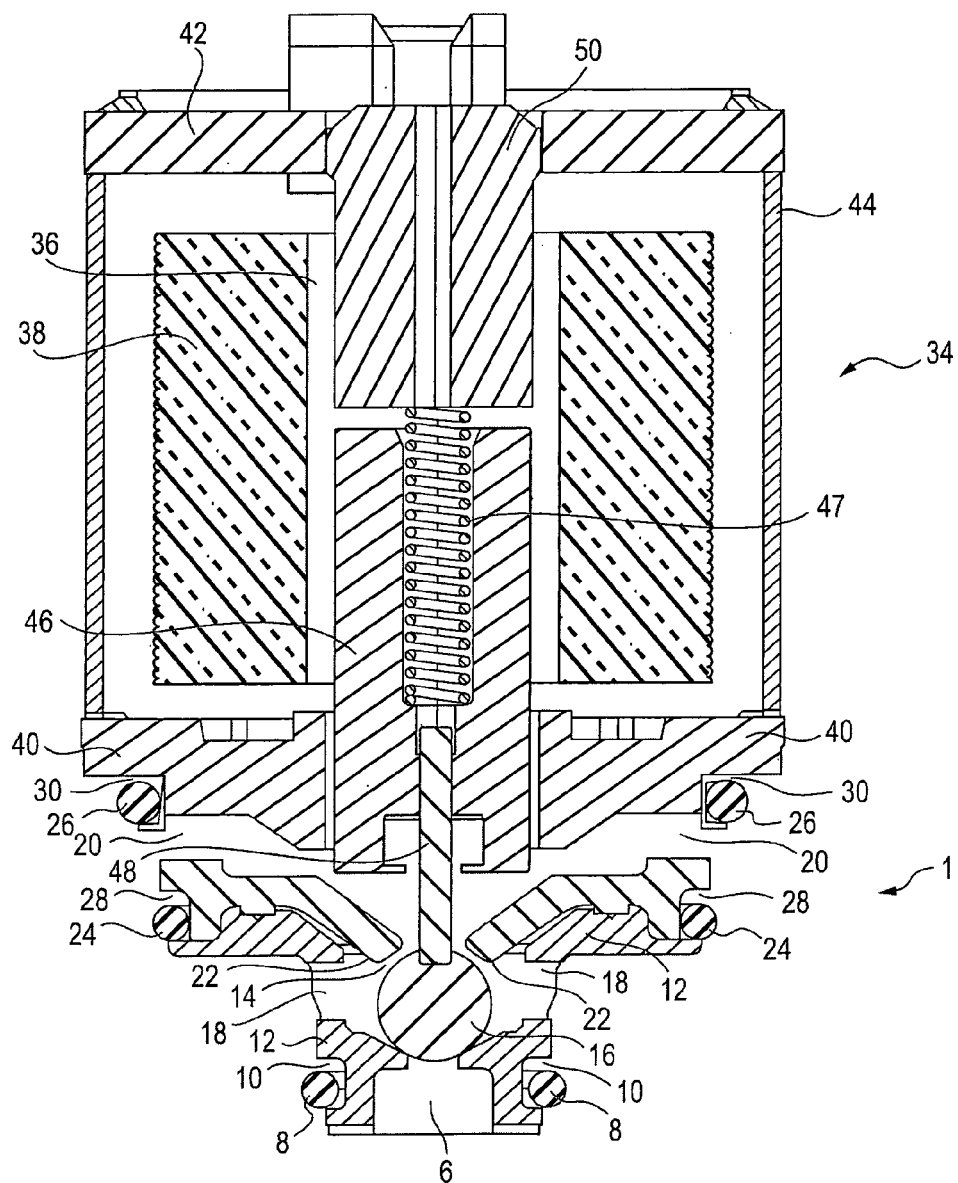
FIG. 1 is a prior art cross-sectional view of an on/off solenoid ball valve.

According to the invention, conventional on/off solenoid ball valves are enhanced to improve their reliability, performance, and ability to be used in an expanded range of applications. In enhanced valves of the invention, a check valve is provided for controlling fluid flow between the valve's pressure control outlet port and exhaust port via a pathway comprising the valve's valving chamber.

Further, due to the additional presence of at least one bypass orifice therein, solenoid ball valves of the invention are now capable of generating a pressure at the pressure control outlet port no matter what position the valve is in—"on" or "off." During operation, pressure generated at the pressure control outlet port of a valve of the invention approximates the inlet port pressure when the valve is in the "on" position. When in the "off" position, pressure generated at the pressure control outlet port is generally less than that so generated when the valve is in the "off" position. Such solenoid ball valves are capable of being used in any application where fluid flow in the manner provided is effective.

While reference is made to engine-related applications, this invention is not limited to applications of that nature. It is envisioned that valves of the invention will find practical use throughout societies of the world. Nevertheless, this invention is exemplified with reference to the valve's usefulness in engine-related applications since the valve's unique features are expected to make possible rapid advancements in that industry, particularly the vast automotive industry. In an exemplary embodiment, at least one valve of the invention is incorporated within an engine drive train system (e.g., within an engine block) of an internal combustion engine (such as that associated with a motorized vehicle).

Internal combustion engines are well known. Such an engine may include a plurality of combustion cylinders, each containing a reciprocable piston connected to a common crankshaft by a connecting rod. In so-called "four-stroke" or "four-cycle" engines, each cylinder is generally provided with one or more intake valves for admitting a fuel/air mixture to the cylinder, and one or more exhaust valves for exhausting burned mixture from the cylinder. A spark plug extending into each cylinder generally ignites the compressed fuel/air mixture at a predetermined time relative to the rotary position of the crankshaft. Typically, the intake valves are actuated by an intake camshaft that is operatively coupled to the crankshaft and that has a plurality of cam lobes radially disposed at varying predetermined angles to cause the intake valves to open and close at the proper preselected times during the rotation of the crankshaft. The exhaust valves are similarly controlled by an exhaust camshaft. In some engines, the intake and exhaust cam lobes are provided on a single, common camshaft.

In an overhead valve engine, the valves may be directly actuated by camshafts disposed on an engine head, or the camshaft(s) may be disposed within the engine block and may actuate the valves via a valve train wherein the valve train includes valve lifters, pushrods, and rocker arms. In V-style engines, alternate cylinders are typically disposed at an included central angle from the crankshaft bearing axis such that even-numbered cylinders are grouped into a first cylinder bank and odd-numbered cylinders are grouped into a second cylinder bank. According to this engine style, a single camshaft disposed within the engine block may actuate all the valves in both cylinder banks. The invention is applicable to either engine style.

In a particular embodiment, the invention is applicable to control of oil pressure for valve lifter activation/deactivation, which application has been found to be desirable. For background, in many traditional four-stroke internal combustion engines, the mutual relationships of the crankshaft, camshaft, and valves are mechanically fixed. That is, the valves are identically, and fully opened and closed with every two revolutions of the crankshaft. This identical and full opening and closing of the valves results in fuel/air mixture being drawn into each cylinder in a predetermined sequence, ignited by the spark plug, with the burned residue being discharged thereafter. This sequence generally occurs irrespective of the rotational speed of the engine or the load being placed on the engine at any given time.

For much of the operating life of a multiple-cylinder engine, however, the load might be met by a functionally smaller engine having fewer firing cylinders, and at low-demand times, fuel efficiency might be improved if one or more cylinders of a larger engine could be withdrawn from firing service. This can be accomplished by deactivating the valve train leading to preselected cylinders in any of various ways, such as by providing special valve lifters having internal locks that may be optionally switched on and off, either electrically or hydraulically. Such switching can also be conveniently performed using electric solenoid control valves to selectively pass oil to the lifters on command from an engine control module (ECM).

In this particular application of the invention, oil is distributed from a global supply gallery through, for example, an oil riser to the solenoid control valves. When a solenoid control valve is energized to open (also referred to as being in the "on" position when the valve is a "normally closed" valve) in this application, oil is admitted into the solenoid control valve and is allowed to flow into an individual supply gallery (e.g., valving chamber) in order to supply adequate pressure to two deactivation valve lifters via two pressure control outlet ports. Outside of the solenoid control valves, a variety of ports, including optional circumventing ports, are generally provided throughout the engine to facilitate this operation. When the solenoid control valves are de-energized to closed (also referred to as being in the "off" position when the valve is a "normally closed" valve) in this application, oil flows to a return gallery without providing the then undesired pressure signal to the deactivation valve lifters.

It is to be appreciated that solenoid ball valves of the invention are able to provide substantial benefits when used in the described and many other applications. For example, by providing a controlled fluid flow to the pressure control outlet ports when the valve is otherwise closed to inlet fluid flow through the inlet port in this application, a controlled pressure of oil is able to be directed to the deactivation valve lifters to provide necessary lubrication thereto. This lubrication is able to be effectively provided irrespective of the on/off position of the valve. In other embodiments of the invention, similar lubrication is able to be provided during applied operation to, for example, hydraulic latch adjustors and rocker arms.

A further benefit is provided in that on/off solenoid ball valves of the invention are able to be utilized in applications previously not capable of effectively employing such valves. For example, valves of the invention are now able to minimize undesired performance changes induced by pressure variations at the pressure control outlet port, which changes are known to arise even while the valve is maintained in an "on" or "off" position. These variations can undesirably impact performance of the overall system.

For applications employing variable valve lifter performance, pressure shifts can undesirably affect performance. For example, an increase in fluid pressure at a valve's pressure control outlet port may lead to the unintended conversion of an associated rocker arm's operating profile from a single to a double egg-shaped profile. This type of conversion may not be desired, however, except when energizing/de-energizing the valve or exceeding another outlet fluid pressure threshold.

Valves of the invention are also capable of providing further benefits. When the valve is open to inlet flow through its inlet port, bypass orifices of the invention help to minimize performance variations imparted by undesired turbulence within the valving chamber. In contrast, such turbulence is exacerbated by conventional positioning of the inlet port and ball valve member such that essentially all inlet flow is received within the valving chamber adjacent the ball valve member.

While internal valve mechanics may vary widely, solenoid ball valves of the invention include at least one inlet port, at least one pressure control outlet port, at least one exhaust port, at least one check valve positioned between the pressure control outlet port and the exhaust port, and at least one bypass orifice positioned to allow inlet fluid flow to the pressure control outlet port irrespective of whether the valve is in the "on" or "off" position. Depending on the application, those of skill in the art will appreciate that the exact character of each port and, therefore, the fluid's path and corresponding fluid pressures outside of the valve will vary accordingly. It is to be understood that those external features may likewise impact the fluid's pressure and flow path within valves of the invention during their applied operation.

At least one inlet port is provided for directing inlet fluid flow into valves of the invention. Those of ordinary skill in the art will appreciate the wide variation in design of inlet ports. It is to be understood, however, that any suitable inlet port design can be used according to the present invention. Further, more than one inlet port can be included, each of which facilitates the selective flow of fluid into the valve.

The inlet fluid pressure will depend on the applied operation of the valve. In an exemplary application, that involving control of oil pressure for valve lifter activation/deactivation, the valve is utilized in conjunction with an engine operating at a speed of about 500 rpm to about 9,000 rpm and fluid (i.e., oil) temperature of about −20° C. to about 140° C. In this embodiment, inlet fluid pressure is often within the range of about 0.5 bar to about 10 bars, more typically within the range of about 0.5 bar to about 5 bars.

At least one pressure control outlet port is provided for directing fluid flow away from the valve to at least one operatively connected component that is at least partially controlled by the valve. From the pressure control outlet port, fluid is discharged to at least one operatively connected component via a fluid pathway. Those of ordinary skill in the art will appreciate the wide variation in design of pressure control outlet ports. It is to be understood, however, that any suitable pressure control outlet port design can be used according to the present invention. Further, more than one pressure control outlet port can be included, each of which facilitates the selective flow of fluid away from the valve.

The outlet fluid pressure will depend on the applied operation of the valve. In an exemplary application, that involving control of oil pressure for valve lifter activation/deactivation, the valve is utilized in conjunction with an engine operating at a speed of about 500 rpm to about 9,000 rpm and fluid (i.e., oil) temperature of about −20° C. to about 140° C. In this embodiment, the valve is capable of generating and maintaining a fluid pressure of about 0.2 bar to about 1 bar at the pressure control outlet port during operation of the valve in the "off" state and a pressure of about 0.5 bar to about 10 bars at the pressure control outlet port during operation of the valve in the "on" state.

At least one exhaust port is provided for selectively directing fluid flow away from the valve via a pathway from the valving chamber having the check valve disposed therein. From the exhaust port, fluid is discharged to any suitable location, which may include for example a sump or global supply gallery. Those of ordinary skill in the art will appreciate the wide variation in design of exhaust ports. It is to be understood, however, that any suitable exhaust port design can be used according to the present invention. Further, more than one exhaust port can be included, each of which facilitates the selective flow of fluid away from the valve.

The exhaust port fluid pressure will depend on the applied operation of the valve. In an exemplary application, that involving control of oil pressure for valve lifter activation/deactivation, the exhaust port is maintained at approximately atmospheric pressure.

Valves of the invention include at least one check valve positioned between the pressure control outlet port and the exhaust port. Generally, the check valve is positioned interior to the location of inlet fluid flow to the pressure control outlet port that is provided by way of the bypass orifice. The check valve operates to control pressure at the pressure control outlet port to a desired level. In an exemplary embodiment, the check valve allows release of excess pressure within solenoid control valves of the invention such that pressure at the pressure control outlet port thereof does not exceed a desired level. Note that the term "check valve" is used to generally describe this component, but those of skill in the art may refer to essentially the same component by other terms (e.g., pressure relief valve, etc.). So long as the function is essentially the same, it is to be understood that those other components also fall within the scope of what is termed a "check valve" herein.

Check valves of the invention include any components that facilitate opening and closing of the exhaust fluid pathway between the pressure control outlet port and the exhaust port in a controlled and coordinated manner with respect to flow through the bypass orifice to the pressure control outlet port. The manner of controlling the exhaust fluid pathway will vary depending on the application. In some applications, check valves of the invention may provide a minimum oil pressure to the exhaust port (which, for example, could be used to maintain sufficient oil in a supply gallery of the system). In other applications, check valves of the invention may be configured such that the fluid pathway from the solenoid control valve via the exhaust port is not always open.

A wide variety of check valve configurations are known to those skilled in the art. The type and number of components in each vary. For example, the check valve can include a valve member located between a biasing member and a valve seat member. Each of the check valve's members can be integrally formed with other components of the valve assembly or they can comprise separate components.

The check valve's configuration will affect its operating mechanism. Check valves of the invention can operate via any suitable mechanism as known to those skilled in the art. For example, the check valve can operate due to pressure-responsive movement of a spring therein. The spring can be any suitable type, such as a compression spring, a tension spring, a leaf spring, a wave spring, or other. In an exemplary embodiment, the check valve comprises a pressure-responsive compression spring.

Valves of the invention also include at least one bypass orifice positioned to allow inlet fluid flow to the pressure control outlet port irrespective of whether the valve is in the "on" or "off" position. Bypass orifices of the invention are those openings that facilitate continuous inlet fluid flow to at least one pressure control outlet port. While it is envisioned that other components (e.g., valves, ports, et cetera) could be positioned in the path of inlet fluid flow between the bypass orifice and pressure control outlet port, it is desirable to maintain that path essentially free of components that prevent continuous inlet fluid flow therethrough. In an exemplary embodiment, once inlet fluid flow travels through the bypass orifice, it travels directly to at least one pressure control outlet port in an unobstructed manner so as to maintain essentially the same fluid pressure throughout the pathway between the bypass orifice and the pressure control outlet port.

Bypass flow orifices of the invention can comprise any suitable shape. So long as the bypass flow orifice is capable of directing the desired amount of bypass flow to the desired pressure control outlet port, benefits of the invention are achieved. Consistent with their shape, dimensions of the bypass orifice will vary depending on the application and other components, not only of the valve itself, but of the other components within the system of application. The size and/or shape of the bypass flow orifice may be fixed or variable. For example, the size and/or shape can vary depending on the operating temperature. Generally, however, in an exemplary embodiment of the invention, the bypass orifice will be sized and shaped so as to direct only a portion of available inlet fluid flow therethrough.

As noted, valves of the invention include at least one bypass orifice. It is beneficial, however, to include at least two bypass orifices in exemplary embodiments of the invention. Further, it is often preferred to arrange multiple bypass orifices in a symmetrical manner with respect to the inlet port and valving chamber so as to minimize pressure variations acting on the ball within the valving chamber. Thus, if two bypass orifices are present in a valve having one inlet port, the bypass orifices are spaced approximately 180° apart around the inlet port of the valve. If three bypass orifices are present in a valve having one inlet port, the bypass orifices are spaced approximately 120° apart around the inlet port of the valve. If four bypass orifices are present in a valve having one inlet port, the bypass orifices are spaced approximately 90° apart around the inlet port of the valve, and so forth.

In operation, inlet fluid flow is directed through at least one bypass orifice as "bypass flow" to the pressure control outlet port. When more than one pressure control output port is present in the valve, bypass flow can be directed to one or more of those pressure control outlet ports. In a representative embodiment, bypass flow is directed to pressure control outlet ports of the valve without contacting the ball component (i.e., ball valve member) of the valve.

The proportion of inlet fluid flow transformed into bypass flow can vary widely. One of skill in the art can readily determine the amount of bypass flow desired and configure the valve accordingly. The amount of bypass flow desired will depend, for example, on the application, the inlet fluid flow pressure, the desired minimum and maximum pressure control outlet port pressures, and other variables. In an exemplary embodiment involving control of oil pressure for valve lifter activation/deactivation, two bypass orifices having a diameter of about 2.8 mm each are positioned symmetrically around one inlet port in a valve of the invention.

As noted, solenoid ball valves of the invention facilitate controlled flow to at least one pressure control outlet port thereof by way of at least one bypass orifice and at least one check valve operatively connected in conjunction with at least one inlet port and at least one exhaust port to provide enhanced on/off solenoid ball valves with many benefits. For ease of comparison with the solenoid ball valves of the invention, FIG. 1 shows a prior art solenoid ball valve. As can be appreciated, many variations in components included therein and associated geometries are known. It is not necessary to the practice of the present invention, or for understanding of comparative background technology to provide further details about such variations, as one of ordinary skill in the art of such valve mechanisms can adapt the present disclosure for use with any suitable solenoid ball valve according to known principles and apparatus.

The prior art valve assembly indicated generally at 1 is encompassed within a solenoid ball valve. No matter how the valve is internally constructed, and how fluid flow is controlled therethrough, solenoid ball valves generally include at least two ports, and more typically at least three ports, each with one or more external openings.

As shown in FIG. 1, valve assembly 1 includes an inlet port 6 isolated from other valve ports by a resilient seal ring 8 disposed in an annular groove 10 formed in an outer surface of a valve body 12. In the valve exemplified, the inlet port 6 selectively facilitates fluid flow into an adjacent enlarged diameter bore 14 during operation based on opening and closing of inlet port 6 by respective upward and downward movement of a ball 16 within the valve. The bore 14 provides a passageway within the valve assembly 1 for selective fluid flow between two or more of inlet port 6, pressure control outlet port 18 (i.e., the port through which fluid is discharged to at least one operatively connected component that is at least partially controlled by the solenoid ball valve), and the exhaust port 20 (i.e., the port through which fluid is discharged to a sump or is returned to rejoin the fluid supply). The valve assembly 1 is capable of averting or limiting fluid flow to the exhaust port 20 by selective seating of the ball 16 against flanged exhaust seats 22 extending within the bore 14.

As further shown in FIG. 1, the pressure control outlet port 16 is isolated from the exhaust port 20 and the inlet port 6 by a pair of resilient seal rings 24, 26. The seal rings 24, 26 are disposed in a spaced relationship on opposite sides of the pressure control outlet port 18 and in annular grooves 26, 30 formed in an outer surface of the valve body 12. In this manner, multiple openings typically associated with the pressure control outlet port 18 and the exhaust port 20 (such as the two openings for each of those elements shown in the cross-sectional view of FIG. 1) are isolated from each other external to the valve body 12. Owing to this configuration, fluid flow is permitted to flow only internally to the valve assembly 6 in a controlled manner based on the positioning of the ball 16 within a bore 14.

Conventionally, the pressure control outlet port 18 includes multiple openings extending circumferentially around the valve body 12 for selective egress of fluid from the valve assembly 6. Likewise, the exhaust port 20 conventionally includes multiple openings extending circumferentially around the valve body 12 for selective egress of fluid from the valve assembly 6. Multiple openings associated with each port are typically spaced approximately equidistant from each other around the entire circumference of a fluid control valve. For example, each port typically includes two openings spaced horizontally 180 degrees apart around the circumference with respect to a vertical axis extending through the valve, as shown in the configuration illustrated in FIG. 1. In many valve assemblies, more than two circumferentially spaced openings (e.g. three, four, five, six, etc.) are typical for each type of port (e.g., the pressure control outlet port 18 and the exhaust port 20). While only one opening for the inlet port 6 is illustrated in FIG. 1, it is known that the inlet port 6 can also include more than one opening, all of which facilitate the selective flow of fluid into the valve assembly 6.

Referring again to FIG. 1, a solenoid operating assembly indicated generally at 34 controls movement of the ball 16. The solenoid operating assembly 34 typically includes a coil bobbin 36 with coil wound thereon and received over a lower flux ring 40 (also known as a "flux collector") attached to an upper end of the valve body 12. An upper flux ring 42 (also known as a "flux collector") is partially received within an upper end of the bobbin 36. The flux rings 40, 42 and the bobbin 36 are retained adjacent the valve body 12 as an operating assembly encompassed by an outer casing 44.

A moveable armature 46 is slidably disposed within the upper flux ring 40. The lower end of the flux ring 40 defines a working air gap with the upper end of the lower flux ring 42. An operating rod 48 is received through an armature 46, secured thereto for movement therewith, with the upper end of the operating rod 48 slidably received in the sliding bearing 50. The operating rod 48 extends downwardly through the sliding bearing 52, which is disposed in the lower flux ring 40. The operating rod 48 extends downwardly into the bore 14 of the valve assembly 1. The lower end of the operating rod 48 operatively joins variable diameter pin 54 extending from the ball 16. As will be appreciated by those skilled in the art, the exact vertical location, if any, of the transformation from the operating rod 48 to a variable diameter pin 54 can vary from that illustrated in FIG. 1.

In operation, the normally closed valve assembly 6 shown in FIG. 1 includes a ball 16 sealably seated against the valve housing 12 with a solenoid operator 34 de-energized. In this state, wherein the inlet port 6 is closed, the pressure control outlet port 18 is open to the exhaust port 20, and thus no pressure signal is provided at the port 18. Upon energization of the solenoid operator 34, the arrangement of the flux rings 40, 42 is such that the upper flux ring 42 acts as a pole piece attracting the armature 46. The armature 46 thereby moves upwardly such that the ball 16 moves progressively away from its seated position at the inlet port 6 18 and closer to the exhaust seats 22. This movement of the ball reduces or eliminates the flow of fluid to the exhaust port 20 and thereby increases pressure to the pressure control outlet port 16. Upon de-energization, the armature 46 moves downwardly to return the ball 18 to a seated position adjacent the inlet port 6.

Note that prior art FIG. 1 describes a solenoid ball valve that is "normally closed" when the solenoid is de-energized. Nevertheless, the invention is applicable to solenoid ball valves that are both "normally closed" and "normally open" when the solenoid is de-energized. Both types of valves and others known by those of skill in the art as "on/off" valves are encompassed within the scope of the present invention.

Figure 2A:
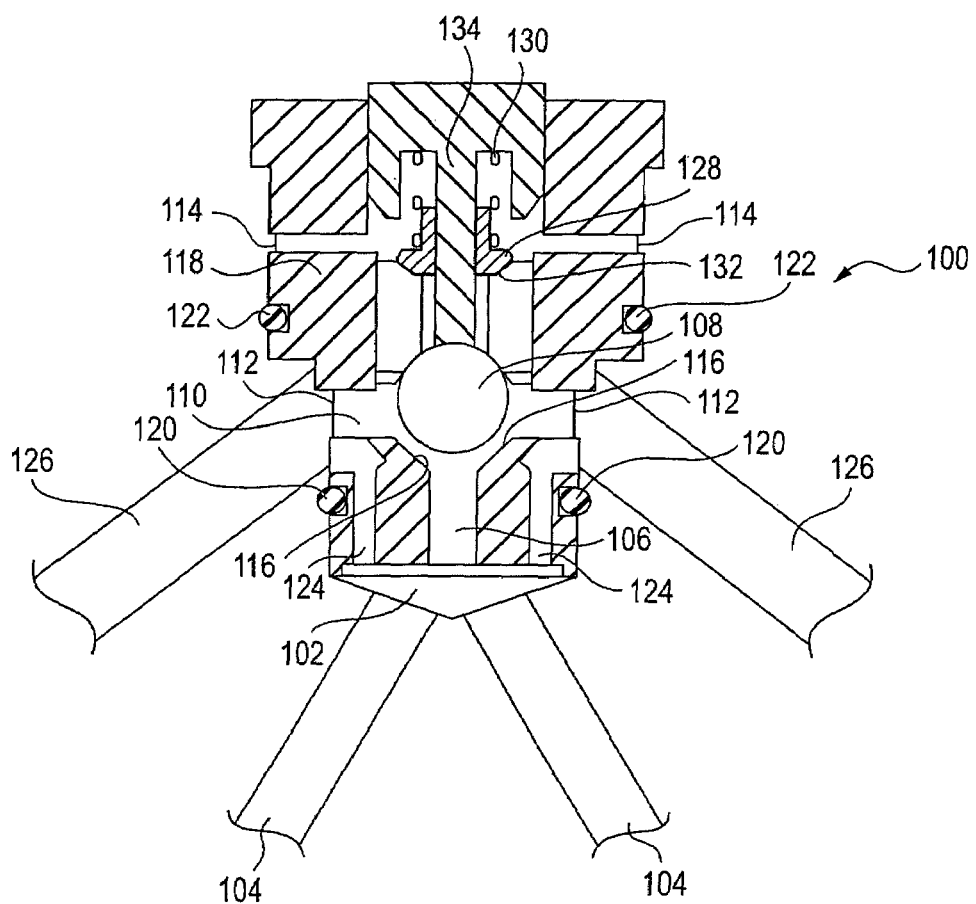
FIG. 2A is a cross-section view of an on/off solenoid ball valve of the invention in an "on" position.
Figure 2B:
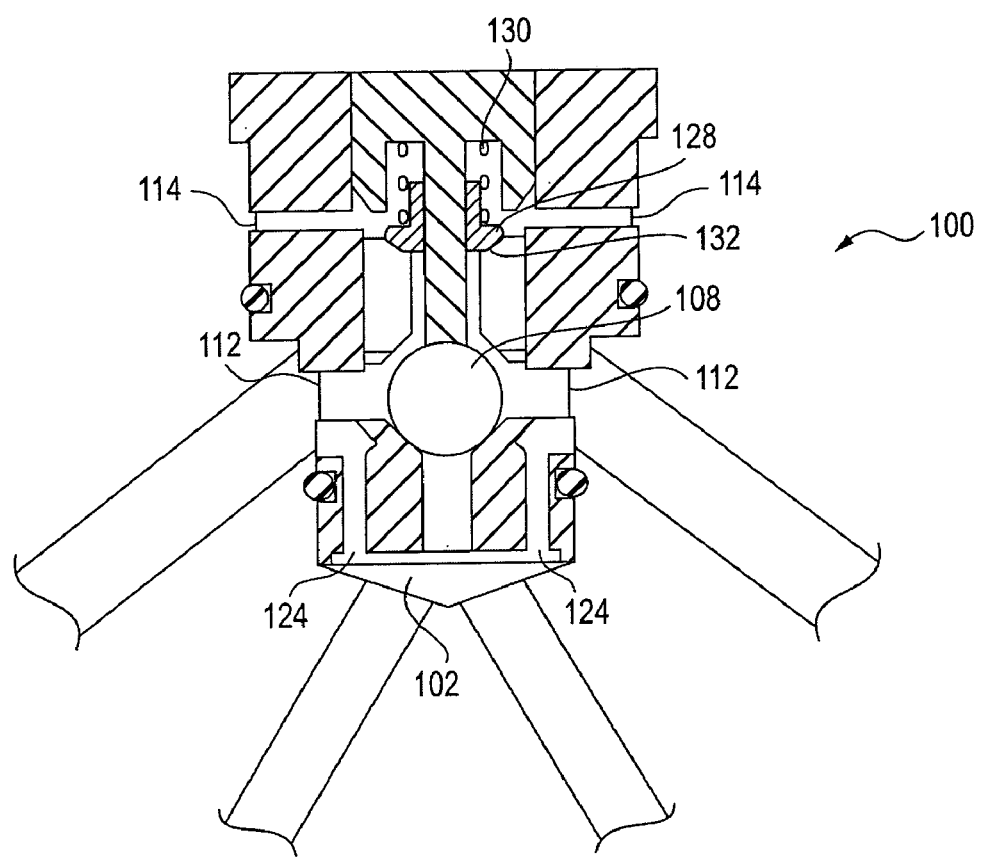
FIG. 2B is a cross-section view of an on/off solenoid ball valve of the invention in an "off" position wherein a check valve thereof prevents fluid flow between a pressure control outlet port and exhaust port therein.
Figure 2C:
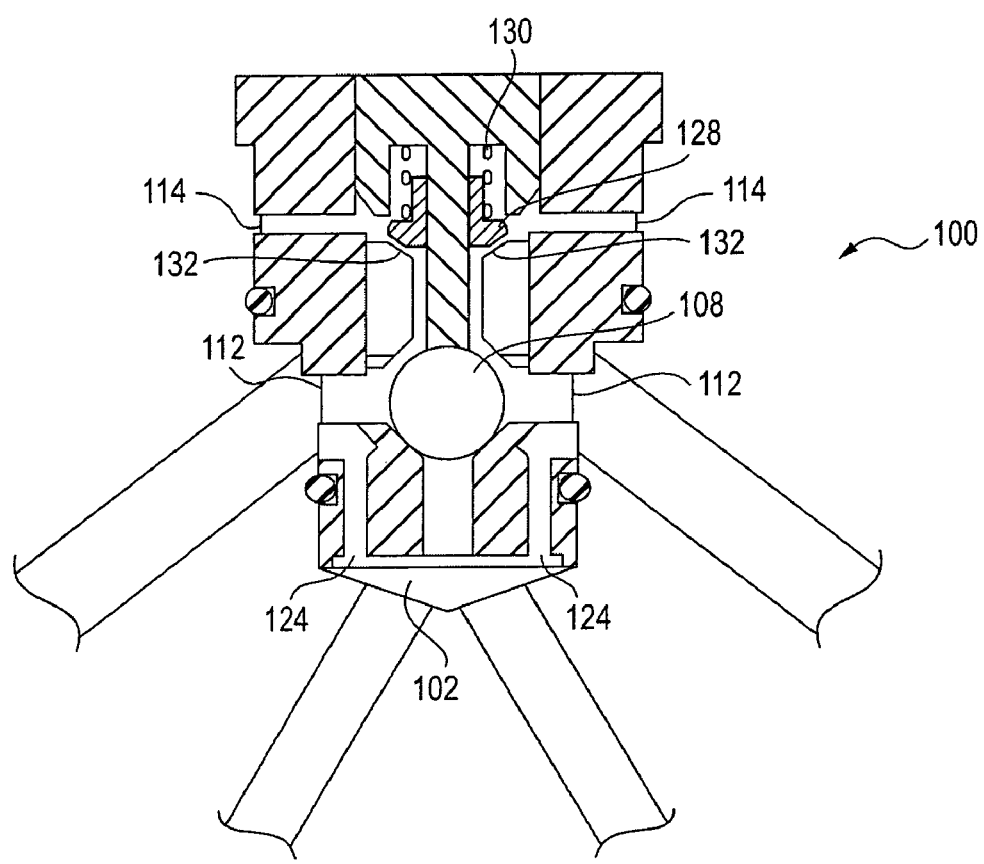
FIG. 2C is a cross-section view of an on/off solenoid ball valve of the invention in an "off" position wherein a check valve thereof allows fluid flow between a pressure control outlet port and exhaust port therein.

Referring now to FIGS. 2A-2C, an exemplary embodiment of an on/off solenoid ball valve assembly 100 of the invention is illustrated. Note that components similar to those referenced in the position shown in FIG. 2A may be denoted by the same reference number in one of FIGS. 2B-2C and/or FIGS. 3A-3D in order to highlight corresponding parts and minimize duplication in the description. Utilizing this format, although they may be identified in later figures, certain components may be described only once with reference to the first figure in which they are shown.

Illustrated in FIG. 2A is a cross-section view of an on/off solenoid ball valve of the invention in an "on" position. Illustrated in FIG. 2B is a cross-section view of an on/off solenoid ball valve of the invention in an "off" position wherein a check valve thereof prevents fluid flow between a pressure control outlet port and exhaust port therein. Illustrated in FIG. 2C is a cross-section view of an on/off solenoid ball valve of the invention in an "off" position wherein a check valve thereof allows fluid flow between a pressure control outlet port and exhaust port therein.

As shown in each of FIGS. 2A-2C, valve assembly 100 includes an inlet port 102 formed at the intersection of inlet oil supply pathways 104. During operation, the inlet port 102 selectively facilitates fluid flow into an adjacent enlarged diameter bore 106 based on the opening and closing of valve. Opening and closing of the valve is made possible by respective upward and downward movement of ball valve member 108 within adjacent valving chamber 110. The valving chamber 110 provides a passageway within the valve assembly 100 for selective fluid flow between two or more of the inlet port 102, pressure control outlet ports 112 (two of which are shown in this embodiment), and exhaust ports 114 (two of which are shown in this embodiment). The valve opens and closes by selective seating of the ball valve member 110 against flanged seats 116 of the valve housing 118 that extend within the valving chamber 110. External to valve assembly 100, inlet port 102 is isolated from the other valve ports via a seal 120 formed in an outer surface of the valve housing 118. Similarly, exhaust ports 114 and pressure control outlet ports 112 are isolated from the other valve ports via a seal 122 formed in the outer surface of the valve housing 118.

Two bypass orifices 124 within the valve assembly 100 are for directing a portion of inlet fluid flow from inlet oil supply pathways 104 to the pressure control outlet ports 112 whereby it is then directed to other components external to the valve assembly 100 via fluid pathways 126. In the "on" position shown in FIG. 2A, a portion of the inlet fluid flow is directed to the pressure control outlet ports 112 via the bypass orifices 124. Further, a portion of the inlet fluid flow is directed through the enlarged diameter bore 106 adjacent inlet port 102 and into the valving chamber 110 adjacent ball valve member 108. After passing through the valving chamber 100, that portion of inlet fluid flow is capable of exiting the valve via pressure control outlet ports 112. When the valve is in the "off" position as shown in FIGS. 2B and 2C, only the portion of inlet fluid flow which travels through the bypass orifices 124 is directed to the pressure control outlet ports 112.

Positioned between the pressure control outlet ports 112 and the exhaust ports 114 is a check valve comprising a check valve member 128 located between biasing member 130 and check valve seat 132. In the position shown in FIGS. 2A and 2B, check valve member 128 is closed against check valve seat 132 in order to prevent fluid flow from pressure control outlet ports 112 to exhaust ports 114. In the position shown in FIG. 2C, check valve member 128 is spaced from check valve seat 132 in order to allow fluid flow between pressure control outlet ports 112 and exhaust ports 114.

The solenoid operating assembly is not shown in FIGS. 2A-2C, but may comprise any suitable components. For example, the solenoid operating assembly may comprise the solenoid operator described with reference to FIG. 1. Operatively coupled with the solenoid operating assembly is a movable armature 134 shown generally in FIGS. 2A-2C. Moveable armature 134 causes upward and downward movement of ball valve member 108 for opening and closing of the valve.

Figure 3A:
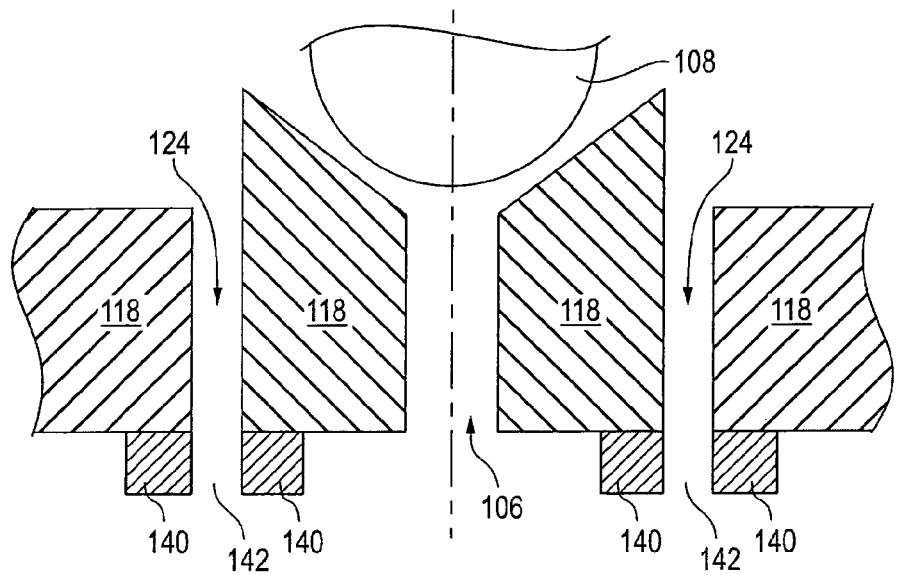
FIG. 3A is a cross-section view of a partial on/off solenoid ball valve of the invention having a temperature-dependent bypass orifice diameter, the size of which is maximized in the view shown.
Figure 3B:
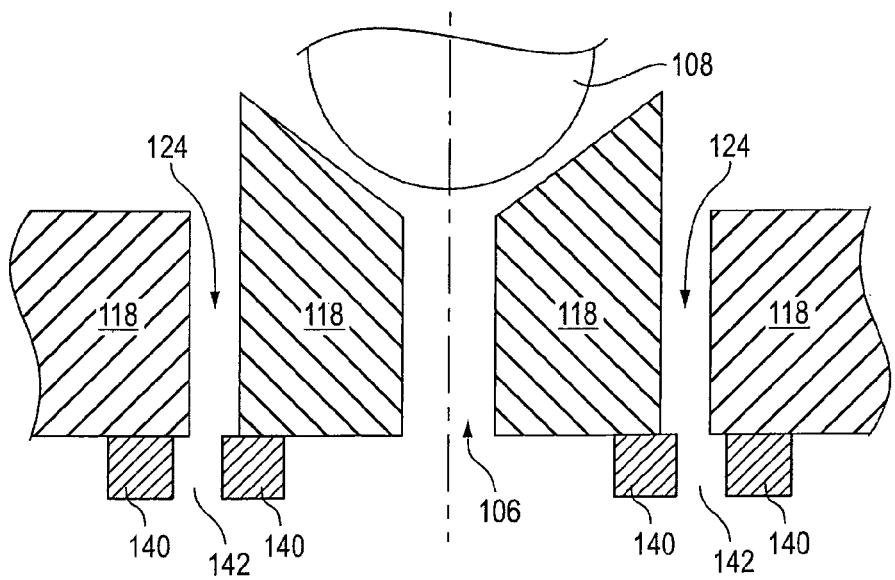
FIG. 3B is a cross-section view of a partial on/off solenoid ball valve of the invention having a temperature-dependent bypass orifice diameter, the size of which is reduced in the view shown as compared to that shown in FIG. 3A.
Figure 3C:
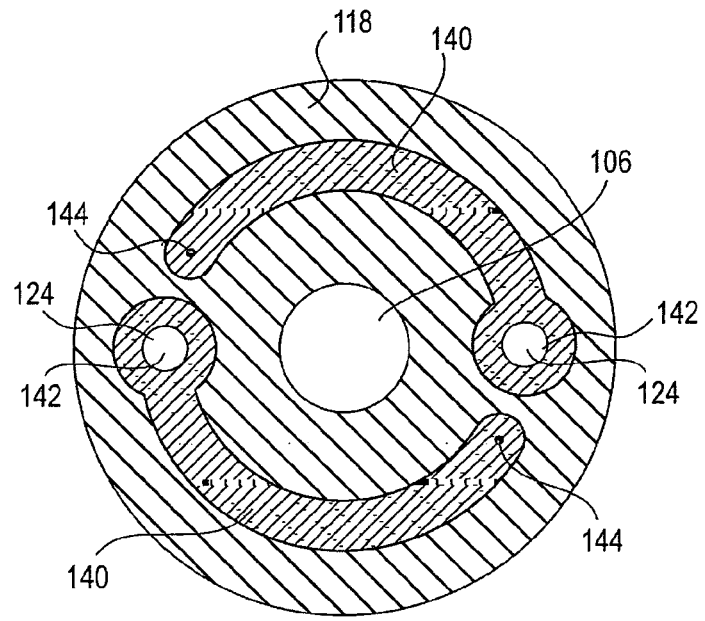
FIG. 3C is a bottom view of the partial on/off solenoid ball valve illustrated in FIG. 3A.

Referring now to FIGS. 3A-3D, a further embodiment of the invention is illustrated with respect to the variable diameter bypass orifices therein. Although different parameters can be used to vary the size of bypass orifices of the invention, in the embodiment illustrated in FIGS. 3A-3D, size of the bypass orifices is temperature-dependent. It should be noted that the relationship between FIGS. 3A and 3C is not of equal scale. The same holds true with respect to FIGS. 3B and 3D.

Although ball valve member 108 is illustrated in an upward position in FIGS. 3A-3D, it is to be understood that variation in size of the bypass orifice 124 according to this embodiment is not dependent on positioning of ball valve member 108. When ball valve member 108 is in the upward position, inlet fluid flow can traverse enlarged diameter bore 106 via inlet port. As described above, opening and closing of the valve is made possible by respective upward and downward movement of ball valve member 108 within an adjacent valving chamber defined within valve housing 118.

The size of each of two bypass orifices 124 that direct a portion of inlet fluid flow is temperature-dependent. As illustrated in FIGS. 3A and 3C, the size of the bypass orifices 124 is maximized. However, in FIGS. 3B and 3D, the size of the bypass orifices 124 is reduced as compared to the size shown in FIGS. 3A and 3C. When size of the bypass orifices 124 is reduced, flow therethrough is likewise reduced. In this manner, bypass flow can be controlled using temperature variations.

An orifice control bar 140 operating in conjunction with each bypass orifice 124 facilitates variations in size of the bypass orifice 124. Proximate the bypass orifice 124, orifice control bar 140 includes an opening 142 extending therethrough. Size and shape of the opening 142 can vary. In one embodiment, size and shape of the opening 142 approximate the size and shape of the adjacent bypass orifice 124. In another embodiment, size of the opening 142 is greater than the size of the adjacent bypass orifice 124. In another embodiment, size of the opening 142 is smaller than the size of the adjacent bypass orifice 124.

In an exemplary embodiment, orifice control bar 140 is made from a thermally expanding material. Any thermally expanding material, for example, a metal such as aluminum can be used for this purpose. It is to be understood, however, that the orifice control bar 140 can be adapted for use with a thermally contracting material as well.

According to overall design of the valve assembly, temperature of the orifice control bar 140 can vary according to the temperature of fluid flowing therethrough, according to the temperature of the adjacent valve housing 118, or as directed by a control source external to or integrated with the valve. As temperature of the orifice control bar 140 varies each opening 142 within the respective orifice control bar 140 moves perpendicularly in relation to the bypass orifice 124 adjacent thereto. In an exemplary embodiment, in order to maximize such movement of the orifice control bar 140, opposite end of the orifice control bar 140 is fixed using any suitable orifice control bar fixture 144.

Figure 3D:
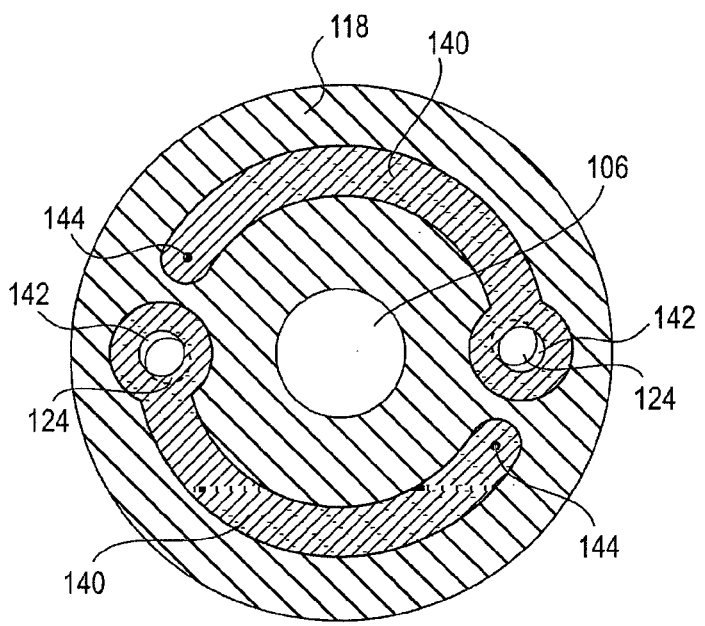
FIG. 3D is a bottom view of the partial on/off solenoid ball valve of FIG. 3B.

In one embodiment, opening 142 of the orifice control bar 140 is aligned with its respective bypass orifice 124 at the normally operating temperature as shown in FIGS. 3A and 3C. In this embodiment, when temperature of the orifice control bar 140 increases or decreases, opening 142 of the orifice control bar 140 will at least partially obscure its respective bypass orifice 124 as shown in FIGS. 3B and 3D based on perpendicular movement of the orifice control bar 140 with respect to the adjacent bypass orifice 124. Although any suitable method and apparatus can be used, in an exemplary embodiment inlet fluid pressure supplies enough upward pressure to maintain an essentially sealed interface between each respective orifice control bar 140 and bypass orifice 124. Maintenance of such an interface facilitates bypass orifices 124 within valves of the invention that are reliably variable in size.

Various modifications and alterations of the invention will become apparent to those skilled in the art of fluid control valves without departing from the spirit and scope of the present invention, which is defined by the accompanying claims. The appended claims are to be construed accordingly. It should also be noted that steps recited in any method claims below do not necessarily need to be performed in the order that they are recited. Those of ordinary skill in the art will recognize variations in performing the steps from the order in which they are recited.

The invention claimed is:

1. An on/off solenoid ball valve comprising:
   at least one inlet port; at least one pressure control outlet port; at least one exhaust port;
   at least one check valve positioned between the pressure control outlet port and the exhaust port; at least one ball valve disposed in a chamber, wherein the chamber is disposed between said at least one inlet port and said at least one pressure control outlet port and at least one bypass orifice connecting said at least one inlet port directly into said at least one pressure control outlet port to form a fluid path that bypasses said chamber and allows fluid to flow directly from said at least one inlet port to said at least one outlet port.

2. The valve of claim 1, wherein the valve comprises more than one inlet port.

3. The valve of claim 1, wherein the valve comprises more than one pressure control outlet port.

4. The valve of claim 1, wherein the valve comprises more than one exhaust port.

5. The valve of claim 1, wherein the exhaust port is maintained at approximately atmospheric pressure.

6. The valve of claim 1, wherein the check valve comprises a valve member located between a biasing member and a valve seat member.

7. The valve of claim 1, wherein at least one of the size and a shape of the bypass flow orifice is variable.

8. The valve of claim 1, comprising multiple bypass orifices arranged in a symmetrical manner with respect to the inlet port.

9. The valve of claim 7, further comprising at least one orifice control bar that varies at least one of the size and the shape of said at least one bypass flow orifice.

10. The valve of claim 9, wherein said at least one orifice control bar is made from a thermally responsive material such that a change in temperature changes a position of said at least one orifice control bar to vary at least one of the size and the shape of said at least one bypass flow orifice.

* * * * *